(12) United States Patent
Nakada et al.

(10) Patent No.: US 11,364,897 B2
(45) Date of Patent: Jun. 21, 2022

(54) PARKING ASSIST SYSTEM

(71) Applicant: HONDA MOTOR CO., LTD., Tokyo (JP)

(72) Inventors: Yuki Nakada, Saitama (JP); Yasushi Shoda, Saitama (JP); Syoichi Kobayashi, Saitama (JP); Yuki Hara, Saitama (JP); Miki Tsujino, Saitama (JP); Hiroshi Yamanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/098,631

(22) Filed: Nov. 16, 2020

(65) Prior Publication Data

US 2021/0179078 A1    Jun. 17, 2021

(30) Foreign Application Priority Data

Dec. 13, 2019  (JP) .............................. JP2019-225937

(51) Int. Cl.
*B60W 30/06*     (2006.01)
*G08G 1/14*      (2006.01)
(Continued)

(52) U.S. Cl.
CPC ............. *B60W 30/06* (2013.01); *B60K 35/00* (2013.01); *G06V 20/58* (2022.01); *G06V 20/586* (2022.01);
(Continued)

(58) Field of Classification Search
CPC ... B60W 30/06; B60K 35/00; B60K 2370/12; B60K 2370/175; B60K 2370/52;
(Continued)

(56) References Cited

U.S. PATENT DOCUMENTS

2020/0346639 A1* 11/2020 Tashiro .................. G01C 21/34

FOREIGN PATENT DOCUMENTS

| JP | H11105686 A   | 4/1999 |
| JP | 2016016681 A  | 2/2016 |

(Continued)

OTHER PUBLICATIONS

Notice of Reasons for Refusal for Patent Application JP 2019-225937, 6 pp.

*Primary Examiner* — Daryl C Pope
(74) *Attorney, Agent, or Firm* — Armstrong Teasdale LLP

(57) ABSTRACT

A parking assist system includes: a display device configured to display a parking space candidate; and a control device configured to control a screen display of the display device, to set the parking space candidate selected by a user to a target parking space, to set a stop position where the vehicle should be stopped in the target parking space, and to execute a driving process to autonomously move the vehicle along a trajectory to the stop position. While executing the driving process, the control device causes the display device to display the trajectory and the stop position and determines whether the stop position is suitable based on external environment information. Upon determining that the stop position is not suitable, the control device corrects the stop position and causes the display device to display the stop position that has been corrected.

8 Claims, 9 Drawing Sheets

(51) Int. Cl.
  *B60K 35/00* (2006.01)
  *G06V 20/58* (2022.01)
  *G06V 20/56* (2022.01)
(52) U.S. Cl.
  CPC .......... *G06V 20/588* (2022.01); *G08G 1/143* (2013.01); *B60K 2370/12* (2019.05); *B60K 2370/175* (2019.05); *B60K 2370/52* (2019.05)
(58) Field of Classification Search
  CPC ...... B60K 2370/1523; B60K 2370/171; B60K 2370/176; B60K 2370/179; B60K 2370/21; G06K 9/00798; G06K 9/00805; G06K 9/00812; G08G 1/143; G08G 1/168; B62D 15/0285
  See application file for complete search history.

(56) References Cited

FOREIGN PATENT DOCUMENTS

| | | |
|---|---|---|
| JP | 2018083480 A | 5/2018 |
| JP | 2018169269 A | 11/2018 |
| JP | 2019188934 A | 10/2019 |

\* cited by examiner

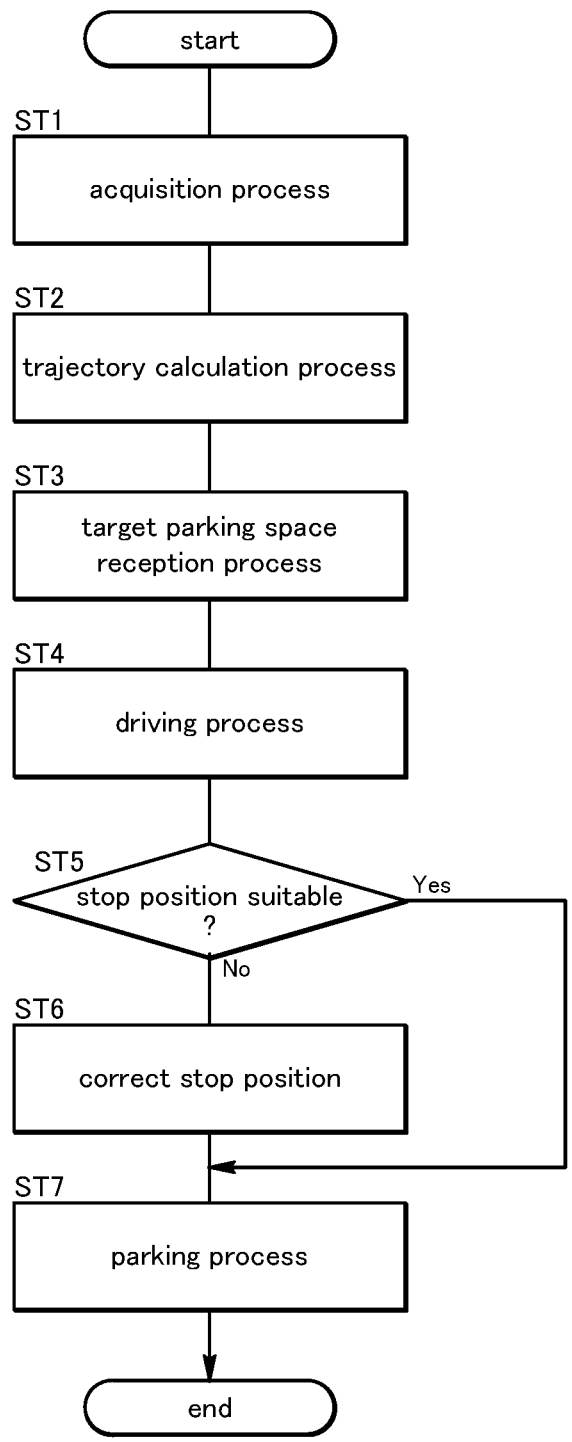

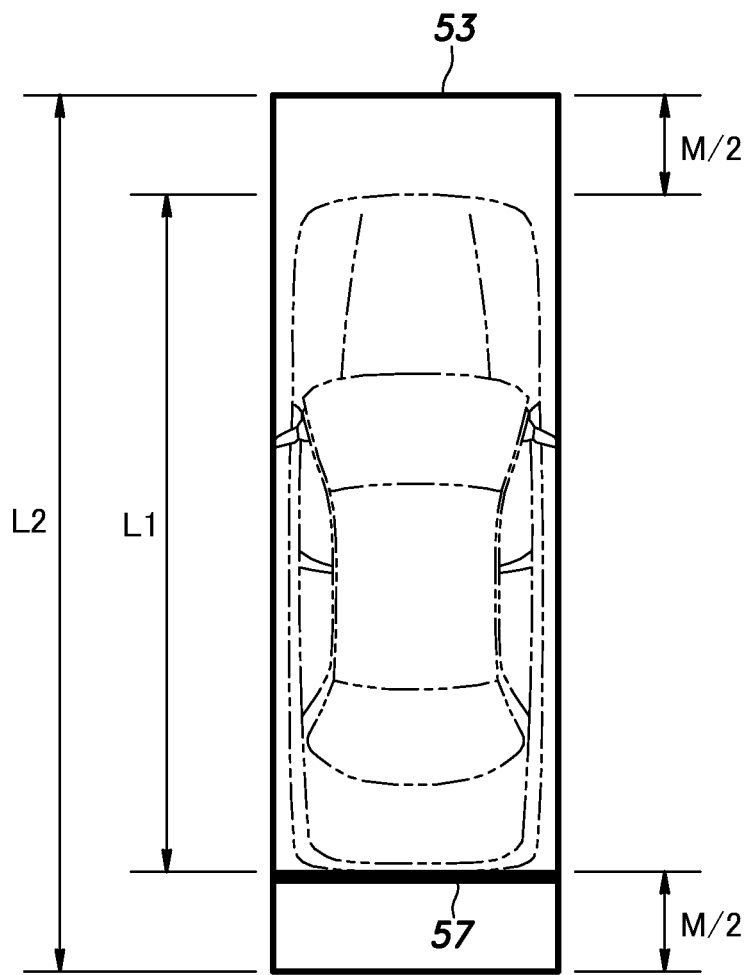

PARKING ASSIST SYSTEM

TECHNICAL FIELD

The present invention relates to a parking assist system configured to autonomously move a vehicle and to park the vehicle.

BACKGROUND ART

An automatic parking device known in the art controls a brake force and/or a driving force of a vehicle, thereby moving the vehicle to a prescribed stop position (see JPH11-105686A). This automatic parking device processes an image behind the vehicle captured by an imaging means, recognizes a parking area and its rear situation (namely, a situation in a rear part of the parking area), and determines the stop position based on the parking area and its rear situation. More specifically, in a case where a wheel stopper is recognized in the rear part of the parking area, the automatic parking device determines a contact position of each rear wheel and the wheel stopper as the stop position. In a case where the wheel stopper is not present in the rear part of the parking area, the automatic parking device recognizes a parking line in the rear part of the parking area, if any, and determines the stop position such that a prescribed space is secured between the parking line and a rear end of the vehicle. In a case where neither the wheel stopper nor the parking line is present in the rear part of the parking area, the automatic parking device determines whether a wall surface is present in the rear part of the parking area. In a case where the wall surface is present therein, the automatic parking device determines the stop position such that a space is secured between the rear end of the vehicle and the wall surface. In a case where no wall surface is present therein, the automatic parking device determines an entrance to the parking area, and determines whether a flat part that continues from the entrance has an enough length to park the vehicle. In a case where the flat part has an enough length to park the vehicle, the automatic parking device determines a position where a front end of the vehicle reaches the entrance as the stop position. In a case where the flat part does not have an enough length to park the vehicle, the automatic parking device determines the stop position such that a space is secured between the rear end of the vehicle and a rear end of the flat part.

Further, a parking space checking device known in the art detects a parking space from a position as far as possible in a travel direction of an own vehicle (see JP2016-16681A). This parking space checking device detects parking lines on a side of the own vehicle from an image captured by a side imaging unit configured to capture an image including a road surface on a lateral side. Further, based on the characteristics of the parking lines on the side of the own vehicle, the parking space checking device detects a parking space where the own vehicle can be parked from an image captured by a travel direction imaging unit configured to capture an image including a road surface in the travel direction of the own vehicle. Based on each parking line, the parking space checking device determines a parking type (perpendicular parking, angle parking, or parallel parking), which indicates a parking mode. When plural parking spaces are detected, the information on the detected plural parking spaces is displayed on a monitor.

An automatic parking device that displays plural parking spaces on a monitor causes a user to select a desired parking space from the displayed plural parking space, and parks a vehicle in the desired parking space selected by the user. The automatic parking device may set the desired parking space selected by the user to a target parking space, and move the vehicle to the target parking space while checking a surrounding condition based on a detection result of an external environment sensor such as a ranging sensor and an imaging device. In a case where a delimiting line such as a white line defining the target parking space is detected breaking or an obstacle that has not been detected at the start of driving control (control to move the vehicle to the target parking space) is detected after the start of the driving control, the automatic parking device may be required to stop the vehicle before the vehicle reaches the target parking space. In such a case, the target parking space displayed on the monitor and the position of the vehicle are different from each other, which may cause discomfort of the user.

SUMMARY OF THE INVENTION

In view of such a problem of the prior art, a primary object of the present invention is to provide a parking assist system that can suppress discomfort of a user in a case where a vehicle cannot be moved to a position set at the selection of a target parking space.

To achieve such an object, one embodiment of the present invention provides a parking assist system (1) including: an external environment information acquiring unit (7) configured to acquire external environment information around a vehicle; a parking space candidate detecting device (41) configured to detect a first parking space (51) and/or a second parking space (52) as at least one parking space candidate based on the external environment information, the first parking space being an undelimited parking space set in a parking area (50), the second parking space being an available delimited parking space; a display device (32) configured to display the parking space candidate; a selection input member (35) configured to receive a selection operation by a user, the selection operation being an operation to select the parking space candidate displayed on the display device; and a control device (15) configured to control a screen display of the display device, to set the parking space candidate selected by the user to a target parking space (53), to set a stop position (57) where the vehicle should be stopped in the target parking space, and to execute a driving process to autonomously move the vehicle along a trajectory (56) to the stop position, wherein while executing the driving process, the control device causes the display device to display the trajectory and the stop position and determines whether the stop position is suitable based on the external environment information, and upon determining that the stop position is not suitable, the control device corrects the stop position and causes the display device to display the stop position that has been corrected. The target parking space is an area spreading on a horizontal plane, and may be also referred to as a target parking area or a target parking position.

According to this configuration, in a case where the control device determines that the stop position is not suitable while executing the driving process, it is possible to reduce a difference between the corrected stop position displayed on the display device and the position of the vehicle. Accordingly, it is possible to suppress the discomfort of the user caused by the difference between the stop position displayed on the display device and the position of the vehicle at the end of the driving process.

In the above configuration, the control device is configured to correct the stop position along the trajectory such that the stop position gets closer to an entrance to the target parking space.

According to this configuration, the stop position can be easily corrected since it is not necessary to correct the trajectory.

In the above configuration, the parking space candidate detecting device is configured to detect the first parking space as the parking space candidate, the control device is configured to determine that the stop position is not suitable when an obstacle (58) present in the target parking space is detected, and upon determining that the stop position is not suitable due to detection of the obstacle, the control device corrects the stop position with a movement amount equal to or less than a prescribed first upper limit.

According to this configuration, in a case where the control device corrects the stop position due to the detection of the obstacle, the movement amount of the stop position is limited to the first upper limit or less. Accordingly, it is possible to further suppress the discomfort of the user caused by the difference between the stop position displayed on the display device and the position of the vehicle.

In the above configuration, the parking space candidate detecting device is configured to detect the second parking space as the parking space candidate, the control device is configured to determine that the stop position is not suitable when a delimiting line (54) on a side of the target parking space is undetectable, and upon determining that the stop position is not suitable due to undetectability of the delimiting line, the control device corrects the stop position with a movement amount equal to or less than a prescribed second upper limit.

According to this configuration, in a case where the control device corrects the stop position due to the undetectability of the delimiting line, the movement amount of the stop position is limited to the second upper limit or less. Accordingly, it is possible to further suppress the discomfort of the user caused by the difference between the stop position displayed on the display device and the position of the vehicle.

In the above configuration, a length (L2) of the target parking space is longer than a total length (L1) of the vehicle, and the second upper limit is set such that the vehicle fits in the target parking space (for example, $M/2 \leq (L2-L1)/2$; M is a margin).

According to this configuration, the vehicle does not stop at a position where the vehicle sticks out of the target parking space at the end of the driving process. Accordingly, it is possible to suppress the discomfort of the user regarding the position of the vehicle at the end of the driving process.

In the above configuration, the parking space candidate detecting device is configured to detect the first parking space and the second parking space as the parking space candidate, the control device is configured to determine that the stop position is not suitable when an obstacle (58) present in the target parking space is detected or when a delimiting line (54) on a side of the target parking space is undetectable, upon determining that the stop position is not suitable due to detection of the obstacle, the control device corrects the stop position with a movement amount equal to or less than a prescribed first upper limit, and upon determining that the stop position is not suitable due to undetectability of the delimiting line, the control device corrects the stop position with a movement amount equal to or less than a prescribed second upper limit that is smaller than the first upper limit.

Generally, it is more difficult for the user to recognize that the delimiting line on the side of the target parking space is undetectable (more specifically, the delimiting line of the parking space candidate displayed on the display device is undetectable to the parking space candidate detecting device) than to recognize that the obstacle is present. According to the above configuration, in a case where the stop position is corrected due to the undetectability of the delimiting line, the stop position is corrected with the movement amount equal to or less than the second upper limit that is smaller than the first upper limit (the upper limit of the movement amount in a case where the stop position is corrected due to the detection of the obstacle). Accordingly, when the vehicle is stopped at the stop position corrected due to the undetectability of the delimiting line, it is possible to suppress the discomfort of the user caused by the difference between the stop position displayed on the display device and the position of the vehicle.

In the above configuration, even if a size of the first parking space and/or the second parking space detected based on the external environment information is less than a size of the target parking space, the parking space candidate detecting device detects the first parking space and/or the second parking space as the parking space candidate.

According to this configuration, even if the overall size of the first parking space and/or the second parking space cannot be detected, the first parking space and/or the second parking space is displayed on the display device as the parking space candidate. Accordingly, the options for the parking space candidate to be set to the target parking space are expanded, so that the parking assist system can be more convenient.

In the above configuration, while executing the driving process, the control device causes the display device to display the target parking space and does not correct a position of the target parking space regardless of whether the stop position is suitable.

According to this configuration, even if the stop position is corrected, the position of the target parking space is not corrected. Accordingly, it is possible to prevent the discomfort of the user caused by a change in the position of the target parking space.

Thus, according to the above configurations, it is possible to provide a parking assist system that can suppress the discomfort of the user in a case where the vehicle cannot be moved to a position set at the selection of the target parking space.

BRIEF DESCRIPTION OF THE DRAWING(S)

FIG. 2 is a flowchart of an automatic parking process;

FIG. 4 is an explanatory diagram of a target parking space;

Figure 8A:
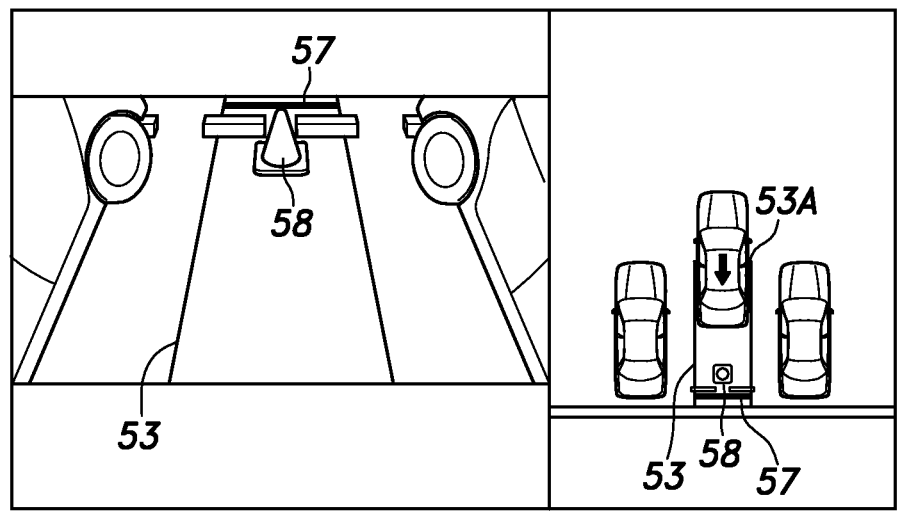
Figure 8B:
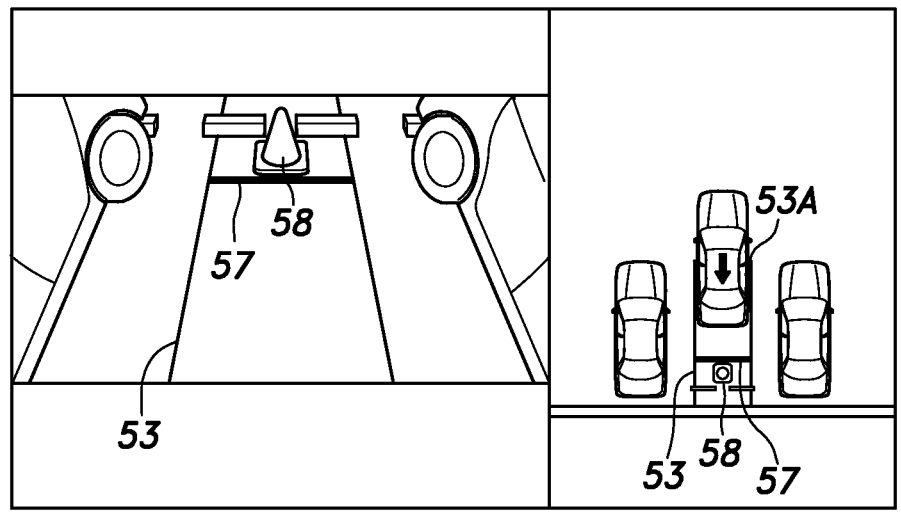
Figure 8C:
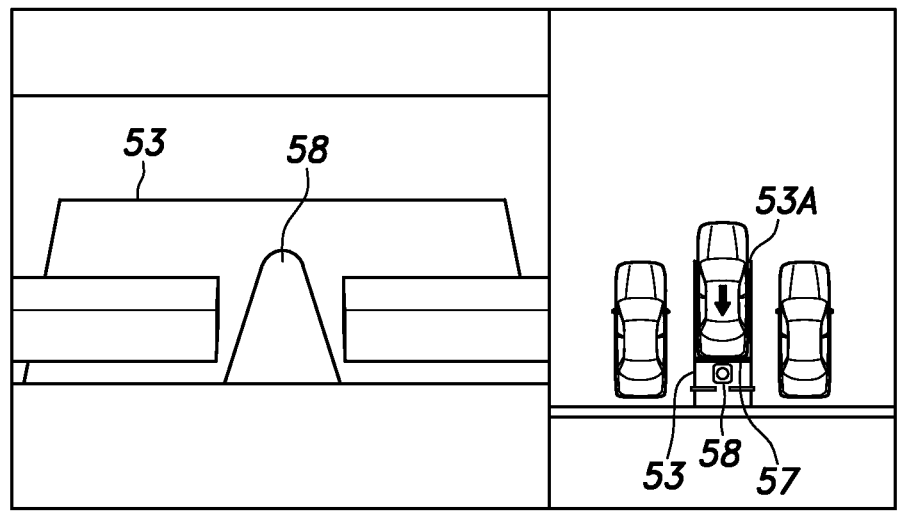
Figure 9A:
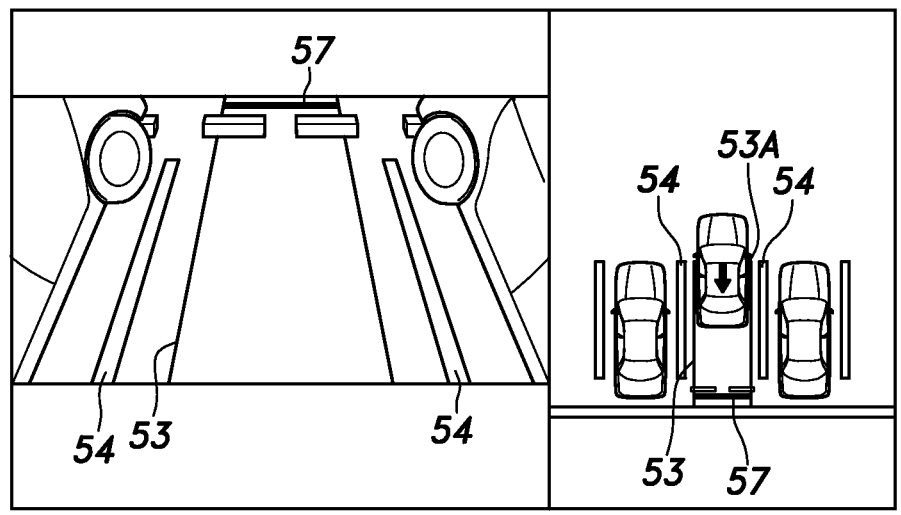
Figure 9B:
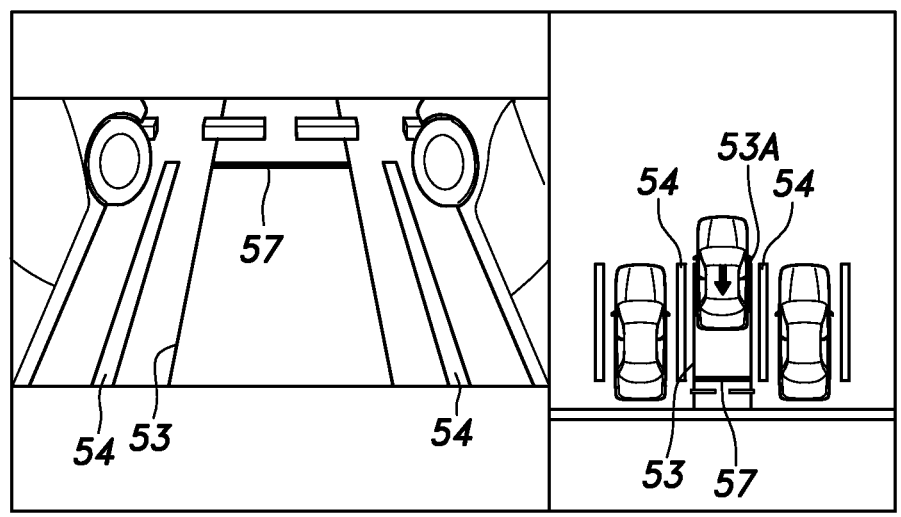
Figure 9C:
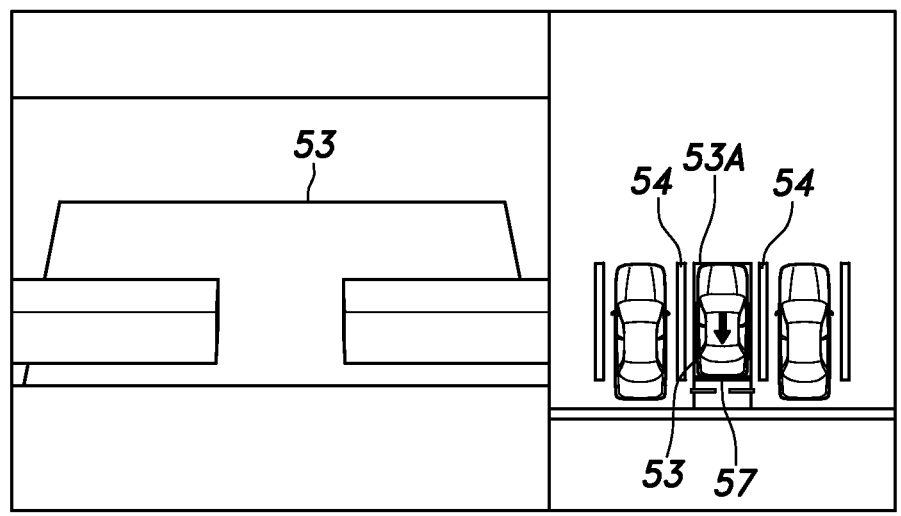

FIG. 8A is a diagram showing the screen display (parking screen) of the touch panel before a stop position is corrected, FIG. 8B is a diagram showing the screen display (parking screen) of the touch panel after the stop position is corrected, FIG. 8C is a diagram showing the screen display (parking screen) of the touch panel when the automatic parking is completed, FIG. 9A is a diagram showing the screen display (parking screen) of the touch panel before the stop position is corrected, FIG. 9B is a diagram showing the screen display (parking screen) of the touch panel after the stop position is corrected, and FIG. 9C is a diagram showing the screen display (parking screen) of the touch panel when the automatic parking is completed.

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
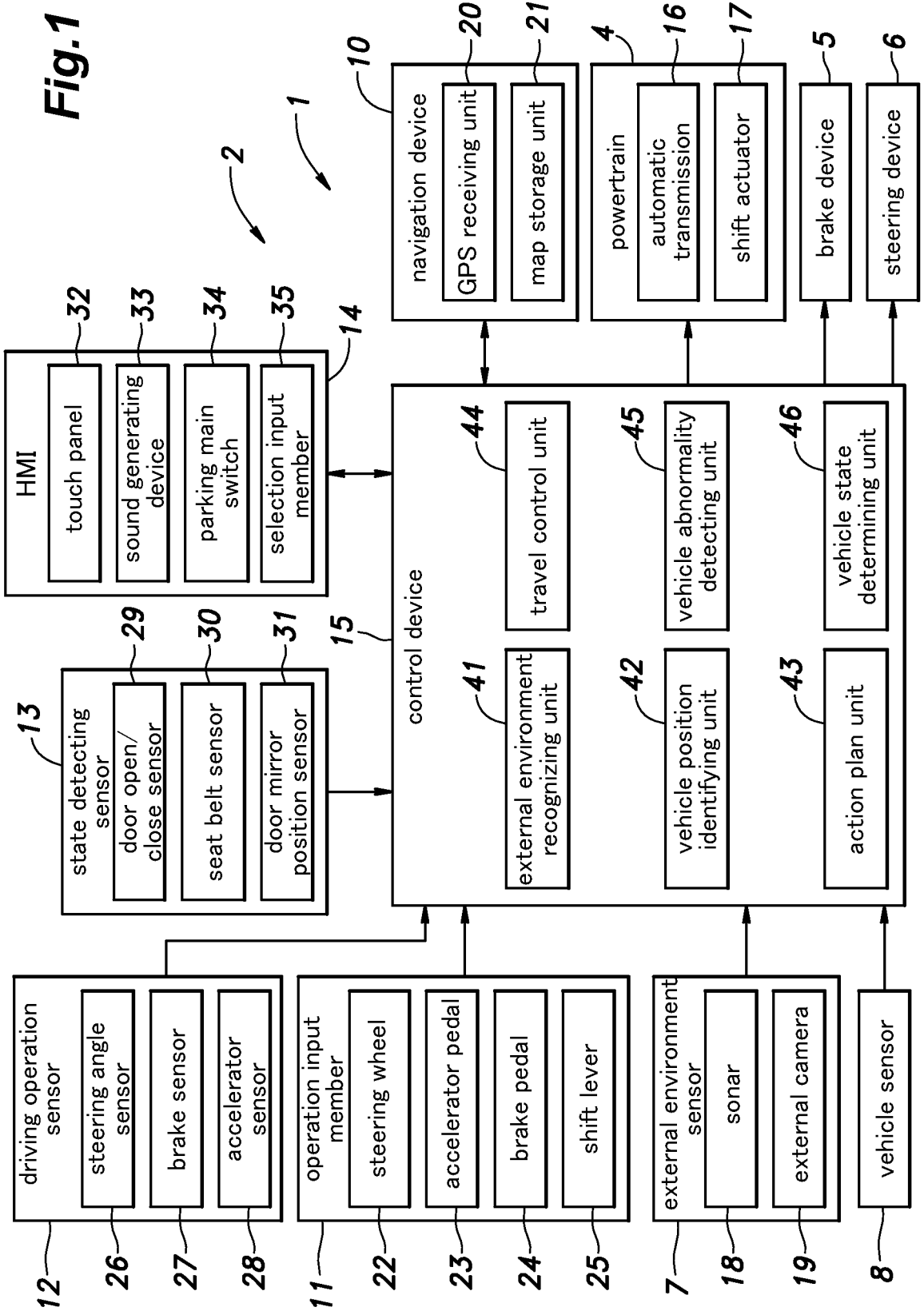
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquiring unit for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (an example of the user) to control the vehicle. The operation input member 11 includes a steering wheel 22, an accelerator pedal 23, a brake pedal 24 (brake input member), and a shift lever 25 (a shift member). The shift lever 25 is configured to receive an operation for selecting the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target space (a target parking space 53 shown in FIG. 3B or a target unparking space) selected by the occupant so as to park or unpark the vehicle.

The parking assist system 1 is constituted of the control device 15, the external environment sensor 7 (the sonars 18 and the external cameras 19) serving as a parking space candidate detecting device, the touch panel 32 serving as a display device on which a selection operation can be performed, and the selection input member 35.

The control device 15 controls the powertrain 4, the brake device 5, and the steering device 6 so as to execute an autonomous parking operation to move the vehicle autonomously to a target parking space 53 and park the vehicle at the target parking space 53 and an autonomous unparking operation to move the vehicle autonomously to a target unparking space and unpark the vehicle at the target unparking space. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space 52 (an example of a second parking space; see FIGS. 5A and 5B) delimited by delimiting lines 54 such as white lines provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

More specifically, the vehicle state determining unit 46 may determine the initiation of the override operation when the pressing amount of the brake pedal 24 acquired (detected) by the brake sensor 27 has reached or exceeded a prescribed threshold (hereinafter referred to as "pressing threshold"). Additionally or alternatively, the vehicle state determining unit 46 may determine the initiation of the override operation when a pressing amount of the accelerator pedal 23 acquired (detected) by the accelerator sensor 28 has reached or exceeded a prescribed threshold. The vehicle state determining unit 46 may also determine the initiation of the override operation when a changing rate of the steering angle obtained (detected) by the steering angle sensor 26 has reached or exceeded a prescribed threshold.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking space candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking space 53. After the target parking space 53 is set, the action plan unit 43 makes the touch panel 32 display a parking screen. When executing the automatic unparking process, the action plan unit 43 first makes the touch panel 32 display an unparking search screen for setting the target unparking space. After the target unparking space is set, the action plan unit 43 makes the touch panel 32 display an unparking screen.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the delimiting lines 54 provided on a road surface. The external environment recognizing unit 41 extracts, based on the acquired position and size of the obstacle and the acquired positions of the delimiting lines 54, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the delimiting lines 54 or the like, has a size sufficient to park the vehicle, and is available (namely, there is no obstacle therein). Each delimited parking space is a space that is delimited by the delimiting lines 54 or the like, has a size sufficient to park the vehicle, and is available (namely, another vehicle (vehicle other than the own vehicle) is not parked).

Next, the action plan unit 43 executes a trajectory calculation process (step ST2) to calculate a trajectory 56 (see FIG. 7B) of the vehicle from a current position of the vehicle to each extracted parking space. In a case where the trajectory 56 of the vehicle can be calculated for a certain parking space, the action plan unit 43 sets the parking space as a parking space candidate where the vehicle can be parked, and make the touch panel 32 display the parking space candidate on the screen (the parking search screen). In a case where the trajectory 56 of the vehicle cannot be calculated due to the presence of the obstacle, the action plan unit 43 does not set the parking space as a parking space candidate and does not make the touch panel 32 display the parking space on the screen. When the action plan unit 43 sets multiple parking space candidates (namely, multiple parking places for which the trajectory 56 of the vehicle can be calculated), the action plan unit 43 makes the touch panel 32 display these parking space candidates.

Next, the action plan unit 43 executes a target parking space reception process (step ST3) to receive a selection operation performed by the occupant to select the target parking space 53, which is a parking space where the occupant wants to park the vehicle, and is selected from the one or more parking space candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking space candidate, the action plan unit 43 makes the touch panel 32 display a frame that indicates the parking space candidate and an icon that corresponds to the frame in at least one of the look-down image and the bird's-eye image (in the look-down image in FIG. 3A) in an overlapping manner. The icon consists of a symbol indicating the parking space candidate (see "P" in FIG. 3A). Also, the action plan unit 43 makes the touch panel 32 display the parking search screen including a notification that instructs the driver to stop the vehicle and select the target parking space 53, so that the touch panel 32 receives the selection operation of the target parking space 53. The selection operation of the target parking space 53 may be performed via the touch panel 32, or may be performed via the selection input member 35.

Figure 3A:
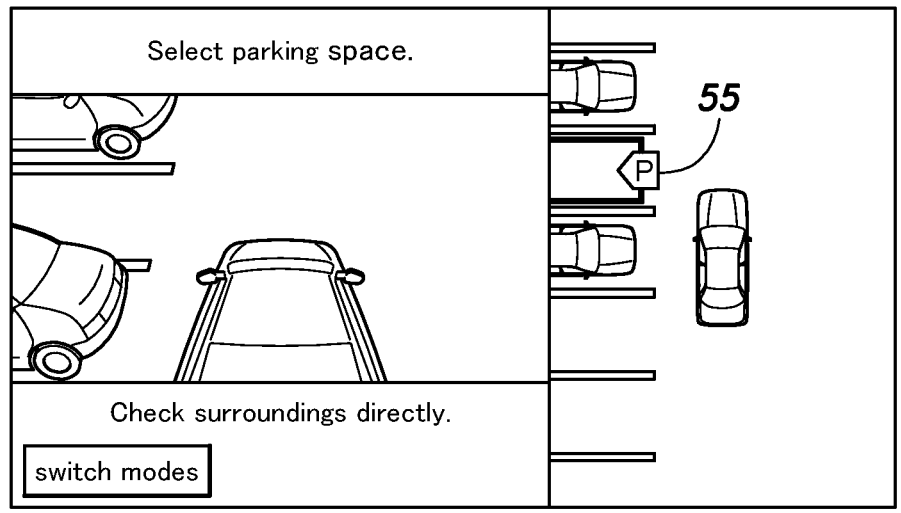
FIG. 3A is a diagram showing a screen display (parking search screen) of a touch panel during a target parking space reception process.
Figure 3B:
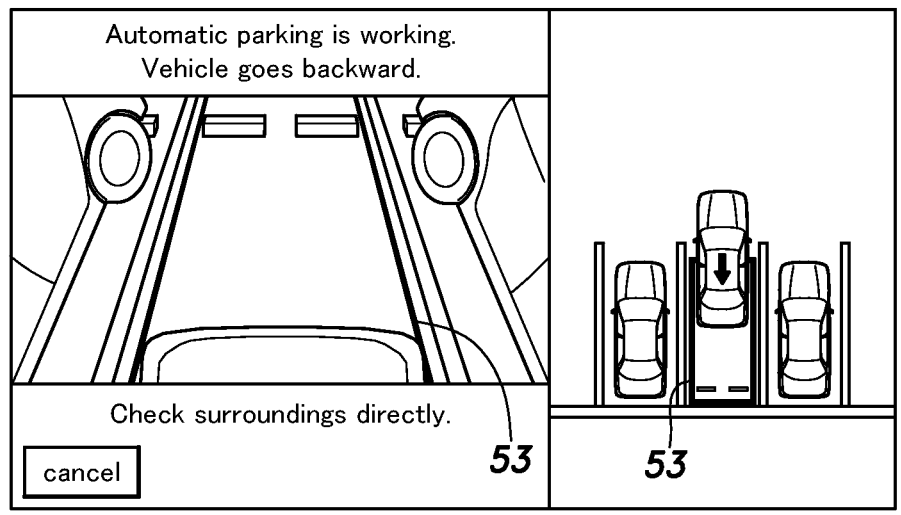
FIG. 3B is a diagram showing the screen display (parking screen) of the touch panel during a driving process.

After the vehicle is stopped and the target parking space 53 is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking space 53 selected from the parking space candidates and an icon that corresponds to the thick frame such that the thick frame and the icon overlap with the look-down image. This icon consists of a symbol indicating the target parking space 53, and is shown in a color different from the symbol indicating the parking space candidate.

The target parking space 53 is a target area (which may be also referred to as a target parking area or a target parking position) to which the action plan unit 43 should move the vehicle by the automatic parking process. The target parking space 53 is spreading on a horizontal plane, and has a rectangular shape as shown in FIG. 4. The target parking space 53 is set to a size having the length L2, which is longer than the total length L1 of the vehicle. The width of the target parking space 53 is set to be the same as the total width of the vehicle, or is set to be slightly larger than the total width of the vehicle. The action plan unit 43 is configured to set a stop position 57 where the vehicle should be stopped in the target parking space 53. Normally, the action plan unit 43 sets the stop position 57 such that the spaces in front of and behind the vehicle are equal to each other. Namely, the action plan unit 43 sets the stop position 57 at a position more forward than a rear end of the target parking space 53 by a half of a margin M (M=L2−L1).

The action plan unit 43 may make the touch panel 32 display the target parking space 53, the stop position 57, and the trajectory 56 from the current position to the stop position 57 such that the target parking space 53, the stop position 57, and the trajectory 56 overlap with the travel direction image and the look-down image of the parking screen (see FIGS. 8A and 8B). The trajectory 56 may be shown by two lines arranged at an interval corresponding to the vehicle width so as to indicate both side surfaces of the vehicle or by a band having a width corresponding to the vehicle width. Alternatively, the trajectory 56 may be shown by a single line indicating a trajectory of the center of the vehicle or a trajectory of the center between the axles. The trajectory 56 shown in the look-down image may be a one-stroke line from the own vehicle to the stop position 57 in the target parking space 53 if the trajectory 56 can be shown within the screen.

After the target parking space 53 is selected and the screen of the touch panel 32 is switched to the parking screen, the action plan unit 43 executes a driving process (step ST4) to make the vehicle travel along the calculated trajectory 56. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory 56. At this time, the action plan unit 43 controls the powertrain 4, the brake device 5, and the steering device 6 so as to execute a switching operation for switching the travel direction of the vehicle (a reversing operation for reversing the travel direction of the vehicle). The switching operation may be executed repeatedly, or may be executed only once.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking space 53, the action plan unit 43 stops the vehicle and ends the driving process.

When the vehicle state determining unit 46 determines that the vehicle is in the prohibition state during the driving process, the action plan unit 43 displays a notification that the automatic parking is suspended or canceled on the touch panel 32 and executes a deceleration process to decelerate the vehicle to stop the same. Thus, when there is a predetermined operation input by the occupant via the operation input member 11, the action plan unit 43 executes the deceleration process, whereby uneasiness that would be felt by the occupant if the movement of the vehicle were continued can be avoided.

In a case where the vehicle abnormality detecting unit 45 detects the vehicle abnormality during the driving process, the action plan unit 43 causes the touch panel 32 to display the notification that the automatic parking is canceled and executes the deceleration process to decelerate and stop the vehicle. During the driving process, when the action plan unit 43 detects the obstacle within a prescribed distance in the travel direction of the vehicle based on the travel direction image captured by the external cameras 19 and the signals from the sonars 18, the action plan unit 43 causes the touch panel 32 to display the notification that the automatic parking is canceled and executes the deceleration process to decelerate and stop the vehicle.

In a case where the action plan unit 43 suspends the automatic parking, the action plan unit 43 causes the touch panel 32 to display a resumption button and a cancellation button. The action plan unit 43 renders the resumption button inoperable while the cause of the suspension exists, and renders the resumption button operable when the cause of the suspension disappears. The resumption button may be displayed on the touch panel 32 such that whether the resumption button is operable can be recognized. When the resumption button receives an input operation, the action plan unit 43 resumes the automatic parking. While executing the driving process, the action plan unit 43 causes the touch panel 32 to display the target parking space 53, the stop position 57, and the trajectory 56 on the travel direction image and the look-down image of the parking screen. Further, while executing the driving process, the action plan unit 43 causes the touch panel 32 to display the own vehicle on the look-down image by using a figure, a photograph, a picture, and the like.

Further, while executing the driving process, the action plan unit 43 determines whether the stop position 57 is suitable (step ST5) based on the travel direction image captured by the external cameras 19 and the signals from the sonars 18. The determination as to whether the stop position 57 is suitable will be described in detail later.

Upon determining that the stop position 57 is not suitable (step ST5: No), the action plan unit 43 corrects the stop position 57 (step ST6), and cause the touch panel 32 to display the stop position 57 that has been corrected. At this time, the action plan unit 43 corrects the stop position 57 such that the vehicle as a whole fits in the target parking space 53. In the present embodiment, in a case where the action plan unit 43 corrects the stop position 57, the action plan unit 43 moves the stop position 57 toward a near side along the trajectory 56. Namely, the action plan unit 43 moves the stop position 57 such that the stop position 57 gets closer to an entrance 53A to the target parking space 53 (the stop position 57 moves forward with respect to the stopped vehicle). In this way, upon determining that the stop position 57 is not suitable, the action plan unit 43 corrects only the stop position 57, and does not correct the position of the target parking space 53. Upon determining that the stop position 57 is suitable (step ST5: Yes), the action plan unit 43 continues the driving process without correcting the stop position 57. The correction of the stop position 57 will be described in detail later.

Figure 3C:
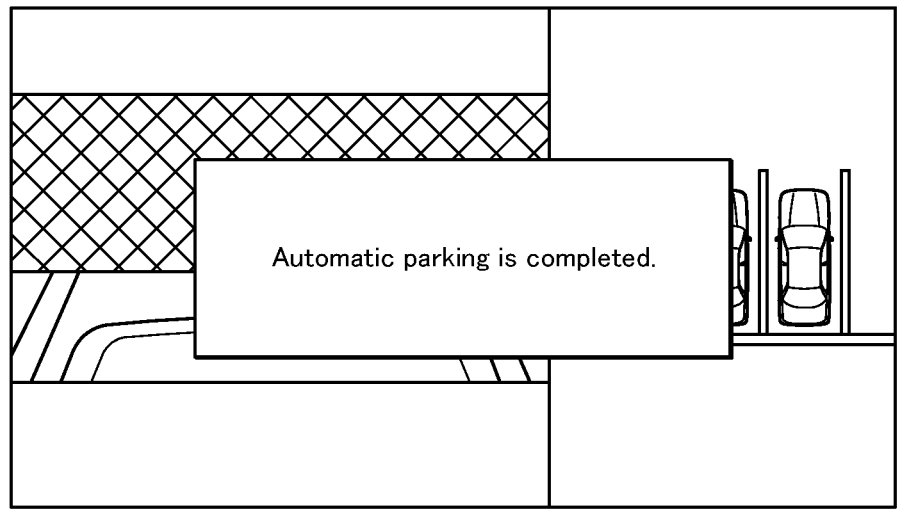
FIG. 3C is a diagram showing the screen display (parking screen) of the touch panel when automatic parking of the vehicle is completed.

When the driving process ends, the action plan unit 43 executes a parking process (step ST7). In the parking process, the action plan unit 43 first drives the shift actuator 17 to set the shift position (shift range) to a parking position (parking range). Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof.

Next, the automatic parking process will be described in more detail. The external environment recognizing unit 41 and the action plan unit 43 perform the acquisition process and the trajectory calculation process in steps ST1 and ST2 as described above. In the acquisition process, the external environment recognizing unit 41 detects one or more parking spaces (positions where the vehicle can be parked) based on the detection result of the external environment sensor 7 (the sonars 18 and the external cameras 19).

Specifically, based on the detection result of the sonars 18, the external environment recognizing unit 41 detects an area around the vehicle that is larger than the vehicle and other than passages and objects (obstacles that hinder the travel of the vehicle), and sets the detected area as a parking area 50 (see FIGS. 6A to 6D). To detect the parking area 50, the external environment recognizing unit 41 detects obstacles within a range of, for example, about 7 to 8 m on either side of the vehicle with respect to the vehicle traveling at a low speed or stopped.

The external environment recognizing unit 41 determines the type of the parking area 50 based on the detected size (size in a plan view) of the parking area 50. The types of the parking area 50 include a perpendicular parking area in which the vehicle can be parked in perpendicular parking, a parallel parking area in which the vehicle can be parked in parallel parking, and an angle parking area in which the vehicle can be parked in angle parking.

In a case where the detected space satisfies the parking size for one vehicle of a certain type (for example, 2.5 m×5 m (in the case of perpendicular parking) or 2 m×7 m (in the case of parallel parking)) but does not satisfy the parking size for two vehicles (for example, 5 m×5 m or 2 m×14 m), the external environment recognizing unit 41 sets at least one rectangular undelimited parking space 51 (an example of a first parking space; see FIGS. 6A to 6D) where the vehicle (own vehicle) should be parked substantially in the center of the detected parking area 50. At this time, the external environment recognizing unit 41 preferably sets the position of the undelimited parking space 51 in a range away from the vehicle laterally by about 1 to 2 m. The external environment recognizing unit 41 may set the position of the undelimited parking space 51 depending on the position of the detected obstacle(s). The undelimited parking space 51 is a vacant (or available) undelimited space with a sufficient size for parking the vehicle as explained above regarding the parking space. When the trajectory 56 of the vehicle from the current position of the vehicle to the undelimited parking space 51 can be calculated by the trajectory calculation process in step ST2, the action plan unit 43 sets the undelimited parking space 51 as a parking space candidate.

In a case where the detected parking area 50 has a depth (depth in the vehicle width direction) sufficient to park the vehicle in perpendicular parking (for example, 6 m) and a width (an opening size in the vehicle travel direction) larger than a perpendicular parking size for two vehicles (for example, 5 m), the external environment recognizing unit 41 sets multiple undelimited parking spaces 51 arranged for perpendicular parking so that the maximum number of vehicles can be parked in the detected parking area 50, and, after performing the trajectory calculation process for these undelimited parking spaces 51, the action plan unit 43 sets them as parking space candidates. Thereby, multiple undelimited parking spaces 51 are set in the large parking area 50, and therefore, the occupant can select, as a target parking space 53, a parking space in which the occupant desires to park the vehicle from among the multiple undelimited parking spaces 51 set in the parking area 50.

Further, in a case where there is another vehicle already parked, the external environment recognizing unit 41 sets the type of the parking area 50 so as to match the parking arrangement of the parked other vehicle, and sets the undelimited parking spaces 51 accordingly. For example, when there is another vehicle parked in angle parking on one of the front and rear sides of the detected parking area 50 with respect to the fore and aft direction of the own vehicle, the external environment recognizing unit 41 sets multiple undelimited parking spaces 51 arranged for angle parking in the parking area 50. When there is no vehicle parked in angle parking in the vicinity, the external environment recognizing unit 41 sets multiple undelimited parking spaces 51 arranged for perpendicular parking in preference to the undelimited parking spaces 51 arranged for angle parking. Thereby, the undelimited parking spaces 51 that are considered appropriate are set in the parking area 50, and display of inappropriate parking space candidates on the touch panel 32 is suppressed.

On the other hand, even if a detected area is smaller than a parking size for a certain parking type (for example, 2.5 m×5 m for perpendicular parking), the external environment recognizing unit 41 regards this detected area as the parking area 50 on condition that the width of the detected area is equal to or more than the width for the certain parking type (for example, 2.5 m for perpendicular parking) and it is estimated that the detected area is suitable for the parking area 50. In such a case, the external environment recognizing unit 41 sets at least one rectangular undelimited parking space 51 (see FIGS. 6A to 6D) where the vehicle (own vehicle) should be parked substantially in the widthwise center of the detected area regarded as the parking area 50. Further, the external environment recognizing unit 41 sets the undelimited parking space 51 such that a front end of the undelimited parking space 51 substantially matches a front end of the surrounding obstacle (another vehicle, a pillar, a wall, or the like).

In this way, even if it is impossible to detect that the obstacle is not present in a rear part of the detected area, this detected area is regarded as the parking area 50 and at least one undelimited parking space 51 is set in the parking area 50. Accordingly, the options for the parking space candidate to be set to the target parking space 53 are expanded, so that the parking assist system 1 can be more convenient.

As described below, by setting the multiple parking space candidates partially overlapping with each other to include at least two of a parallel parking space candidate, a perpendicular parking space candidate, and an angle parking space candidate, it becomes possible to display, on the touch panel 32, parking space candidates having longitudinal directions intersecting with each other in the parking area 50, and options for the target parking space 53 are expanded.

In a case where there is no other vehicle already parked and the detected parking area 50 does not have a sufficient depth to park the vehicle in perpendicular parking but has a width (opening size in the vehicle travel direction) larger than a parallel parking size for two vehicles (for example, 14 m), the external environment recognizing unit 41 sets multiple undelimited parking spaces 51 arranged for parallel parking so that the maximum number of vehicles can be parked in the detected parking area 50.

Furthermore, in a case where the detected parking area 50 has a depth sufficient to park the vehicle in perpendicular parking (for example, 6 m) and a width larger than a parallel parking size sufficient to park the vehicle in parallel parking (for example, 7 m), the external environment recognizing unit 41 sets multiple undelimited parking spaces 51 arranged for perpendicular parking and at least one undelimited parking space 51 arranged for parallel parking in the detected parking area 50. At this time, the undelimited parking spaces 51 for perpendicular parking and the undelimited parking space 51 for parallel parking; namely, the undelimited parking spaces 51 having longitudinal directions intersecting with each other are set to partially overlap with each other.

Also, the external environment recognizing unit 41 may coordinate the parking space candidates by using both the detection result of the sonars 18 and the detection result of the external cameras 19. Specifically, when delimiting lines 54, such as white lines, that define delimited parking spaces 52 (FIGS. 5A and 5B) can be clearly detected, the external environment recognizing unit 41 preferentially sets the delimited parking spaces 52 detected by the external cameras 19 as parking space candidates. When there are no delimiting lines 54 that can be detected by the external cameras 19, the external environment recognizing unit 41 sets the undelimited parking spaces 51 set in the parking area 50 detected by the sonars 18 as parking space candidates. When the delimiting lines 54 are unclearly detected by the external cameras 19, the external environment recognizing unit 41 adjusts the position of one or more undelimited parking spaces 51 detected by the sonars 18 in accordance with the position of the delimiting lines 54 and sets the one or more undelimited parking spaces 51 as parking space candidates.

Alternatively, the external environment recognizing unit 41 may detect the parking space candidates by using only the analysis result of the image captured by the external cameras 19. More specifically, in a case where two delimiting lines 54 drawn on the road surface is detected, the external environment recognizing unit 41 sets the delimited parking space 52 in an area between the two delimiting lines 54 on condition that the two delimiting lines 54 each have a length equal to or more than a prescribed length (for example, 5 m) and are provided parallel to each other at an interval suitable for the delimited parking space 52. This delimited parking space 52 corresponds to the delimited parking space of the above parking space.

At this time, even if a size of the area delimited by the two delimiting lines 54 is smaller than a parking size for a certain parking type (for example, 2.5 m×5 m for perpendicular parking), the external environment recognizing unit 41 regards the area delimited by the two delimiting lines 54 as the delimited parking space 52 on condition that the interval between the two delimiting lines 54 is equal to or more than the width for the certain parking type (for example, 2.5 m for perpendicular parking) and it is estimated that the area delimited by the two delimiting lines 54 is suitable for the delimited parking space 52. In such a case, the external environment recognizing unit 41 sets the delimited parking space 52 (see FIGS. 5A and 5B) substantially in the widthwise center of the interval between the two delimiting lines 54. Further, the external environment recognizing unit 41 sets the delimited parking space 52 such that a front end of the delimited parking space 52 substantially matches front ends of the two delimiting lines 54. In a case where a front end of one of the two delimiting lines 54 protrudes forward with respect to a front end of the other of the two delimiting lines 54, the external environment recognizing unit 41 sets the delimited parking space 52 such that the front end of the delimited parking space 52 substantially matches the front end of the other of the two delimiting lines 54.

In this way, even if it is impossible to detect that the two delimiting lines 54 are present in a rear part of the delimited parking space 52, these two delimiting lines 54 are regarded as the delimiting lines 54 for delimiting the delimited parking space 52, and thus the delimited parking space 52 is set based on the two delimiting lines 54. Accordingly, the options for the parking space candidate to be set to the target parking space 53 are expanded, so that the parking assist system 1 can be more convenient.

In this way, the external environment sensor 7 (the sonars 18 and the external cameras 19), the external environment recognizing unit 41, and the action plan unit 43 cooperate with each other to function as a parking space candidate detecting device configured to detect, as the parking space candidates, the undelimited parking spaces 51 set in the parking area 50 around the vehicle and/or the delimited parking spaces (available delimited spaces for parking) 52 around the vehicle. Namely, the parking space candidate detecting device is configured to detect multiple parking space candidates, each consisting of an undelimited parking space 51 set in the parking area 50 around the vehicle or a delimited parking space 52 around the vehicle.

The action plan unit 43 performs the trajectory calculation process for all of the undelimited parking spaces 51 and thereafter sets them as parking space candidates. In addition, the action plan unit 43 performs the trajectory calculation for the available (vacant) delimited parking spaces 52 (FIGS. 5A and 5B) detected by the external cameras 19 and when the trajectory 56 of the vehicle can be calculated for some delimited parking spaces 52, sets these delimited parking spaces 52 as parking space candidates.

The action plan unit 43 displays a frame indicating the detected parking space candidate on the screen of the touch panel 32 as described above. When multiple parking space candidates are detected, the action plan unit 43 displays frames indicating the respective parking space candidates on the screen of the touch panel 32. However, in the action plan unit 43, an upper limit number of the parking space candidates to be displayed on the touch panel 32 is set, and when the number of the detected parking space candidates exceeds the upper limit number, the action plan unit 43 performs a parking space candidate selection process of selecting the parking space candidates to be displayed on the touch panel 32 from the detected parking space candidates according to the predetermined rule. In the present embodiment, the upper limit number of the parking space candidates displayed on the touch panel 32 is set to 3.

Figure 5A:
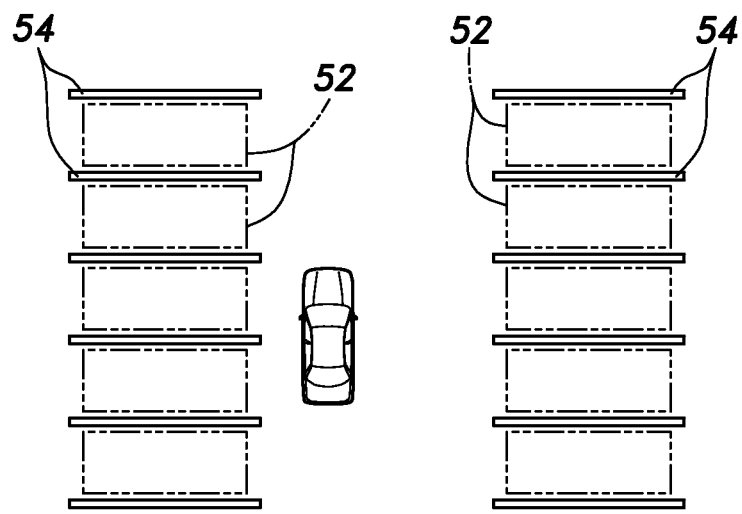
FIG. 5A is an explanatory diagram showing second parking spaces detected as parking space candidates.
Figure 5B:
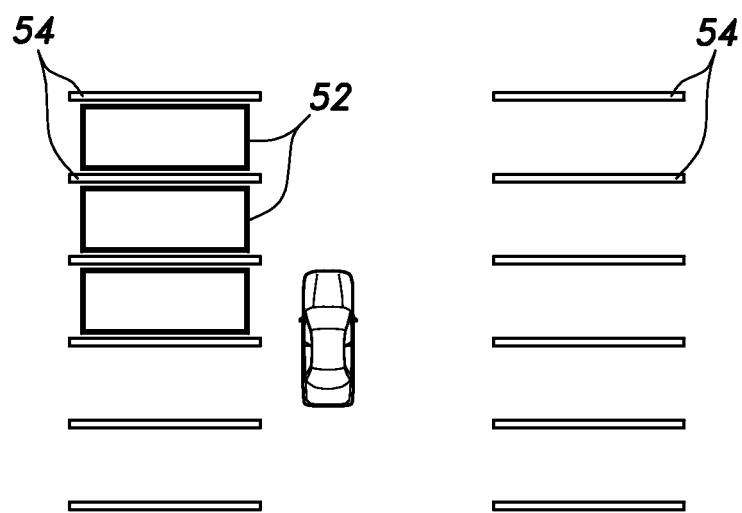
FIG. 5B is another explanatory diagram showing second parking spaces detected as parking space candidates.

For example, if the vehicle is stopped on a passage in a property as shown in FIG. 5A and the automatic parking process is started, the action plan unit 43 selects the parking space candidates (in this example, the delimited parking space 52) to be displayed on the touch panel 32, as shown in FIG. 5B.

Figure 6A:
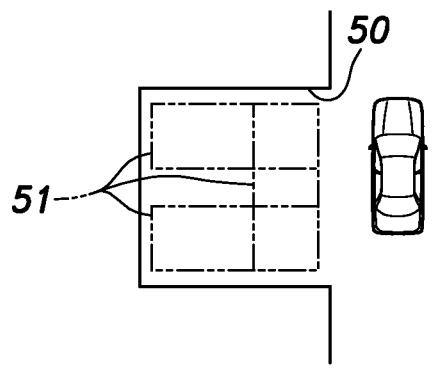
FIG. 6A is an explanatory diagram showing a parking area.
Figure 6B:
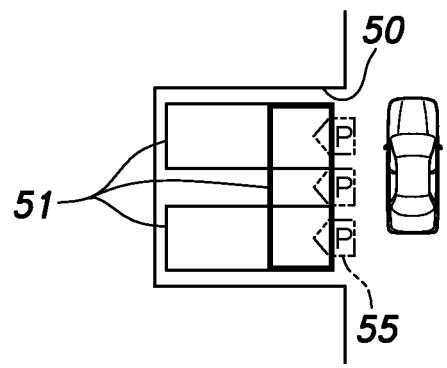
FIG. 6B is an explanatory diagram showing the parking space candidates detected in the parking area.

On the other hand, in a case where the automatic parking process is started in a place where the delimited parking space 52 cannot be detected as shown in FIG. 6A, the external environment recognizing unit 41 detects one parallel parking space and two perpendicular parking spaces (undelimited parking spaces 51) in the parking area 50 such that the parallel parking space partially overlaps with each of the perpendicular parking spaces. In this case, as shown in FIG. 6B, if the action plan unit 43 causes the parking space candidates corresponding to the detected undelimited parking spaces 51 to be displayed on the touch panel 32 so as to partially overlap with each other, the arrangement of the parking space candidates becomes complicated.

Figure 6C:
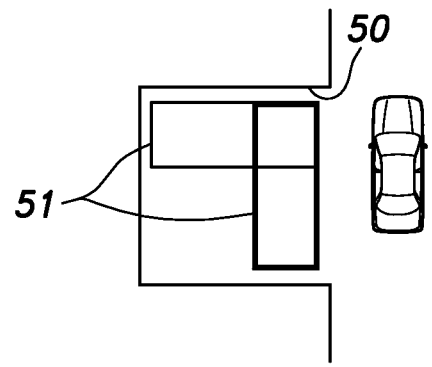
FIG. 6C is an explanatory diagram showing selected parking space candidates.
Figure 6D:
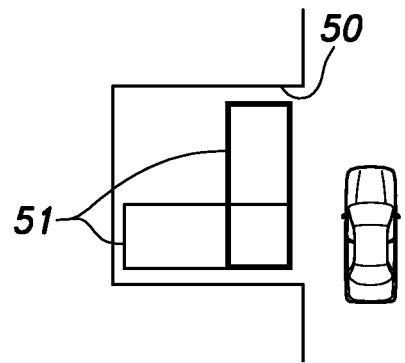
FIG. 6D is another explanatory diagram showing selected parking space candidates.

Therefore, when the multiple parking space candidates partially overlapping with each other are detected, the action plan unit 43 limits the number the detected parking space candidates that are allowed to be displayed on the touch panel 32 to two. Specifically, as shown in FIG. 6C and FIG. 6D, the action plan unit 43 causes two mutually overlapping parking space candidates selected according to the above rule(s) to be displayed on the touch panel 32 so as to partially overlap with each other and be selectable.

As described above, the external environment recognizing unit 41 is configured to detect an area around the vehicle other than passages and obstacles as the parking area 50 and to set, in the parking area 50, multiple undelimited parking spaces 51.

In a case where the automatic parking process is started by an operation of the parking main switch 34 while the vehicle is traveling, the action plan unit 43 acquires multiple parking spaces (spaces where the vehicle can be parked) successively from the external environment recognizing unit 41 and, when the number of the parking space candidates detected from these parking spaces exceeds the upper limit number, removes the parking space candidate having the lowest priority from the parking space candidates to be displayed on the touch panel 32 and erases the information thereof from the memory.

As described with reference to FIG. 3A, in the parking search screen, the action plan unit 43 displays the look-down image and the bird's-eye image side by side on the touch panel 32. That is, the action plan unit 43 is configured to be capable of performing image processing to convert the surrounding image captured by the external cameras 19 into the look-down image and the bird's-eye image. Thereby, the parking space candidates and the target parking space 53 are displayed to be easily recognized by the occupant. Further, as described with reference to FIG. 3B, in the parking screen, the action plan unit 43 displays the look-down image and the travel direction image side by side on the touch panel 32. Thereby, the occupant can confirm the travel direction on the screen and check the progress of the autonomous movement operation in the automatic parking process in the look-down image.

Here, the look-down image is an image of the vehicle and its surroundings viewed from above. The look-down image is displayed with the front of the vehicle facing upward on the screen, and an image representing the vehicle is composited in the center of the surrounding image. The bird's-eye image is an image of the vehicle and a part of the surrounding area of the vehicle positioned in the travel direction as viewed downward in the travel direction from a view point above the vehicle and shifted in the direction opposite to the travel direction. The bird's-eye image is displayed so that the travel direction of the vehicle coincides with the upward direction of the screen, and an image representing the vehicle is composited at the bottom of the (partial) surrounding image. When the vehicle is moving forward, the bird's-eye image is an image of the vehicle and an area in front of the vehicle as viewed downward in the forward direction from a view point above and rear of the vehicle. When the vehicle is moving backward, the bird's-eye image is an image of the vehicle and an area to the rear of the vehicle as viewed downward in the rear direction from a view point above and front of vehicle. It should be noted that the determination as to whether the vehicle is moving forward or backward may be made based on the vehicle speed or the shift range. The bird's-eye image when the vehicle is stopped or in the parking range may be an image of the vehicle and the front area as viewed forward and downward as in the same manner as when the vehicle is moving forward.

Figure 7A:
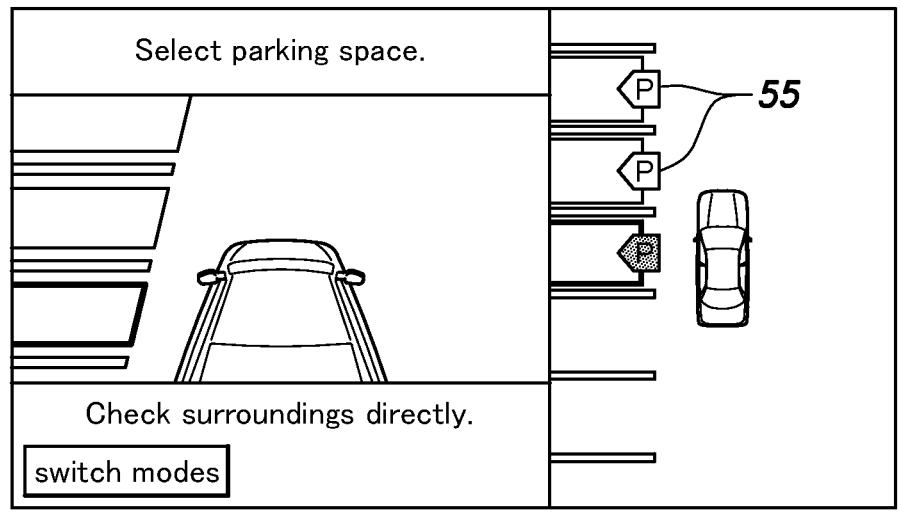
FIG. 7A is a diagram showing the screen display (parking search screen) of the touch panel before the selection of a target parking space.

As shown in FIG. 7A, in the parking search screen, the action plan unit 43 displays the upper limit number (3 or 2 in the present embodiment) of parking space candidates as rectangular frames and also displays the same number of icons 55 for selection so as to be associated with the corresponding parking space candidates. The parking space candidates are displayed to be superimposed on the surrounding image in the look-down image and the bird's-eye image, and the icons 55 are displayed only on the surrounding image in the look-down image in a superimposing manner. The frame of the parking space candidate selected by the cursor is shown by a thick line that is thicker than that of the frames of the other parking space candidates, and the icon 55 corresponding to the parking space candidate selected by the cursor is shown in a darker color than the icons 55 corresponding to the other parking space candidates.

In this way, in the parking search screen, the action plan unit 43 displays multiple parking space candidates on the touch panel 32 so as to be superimposed on the images captured by the external cameras 19 (the look-down image and the bird's-eye image), whereby the occupant can easily understand where in the parking area 50 the multiple parking space candidates displayed on the screen of the touch panel 32 are, and it becomes easy to select from among the multiple undelimited parking spaces 51.

Further, the action plan unit 43 displays the upper limit number of icons 55 for selection on the touch panel 32 so as to be associated with the corresponding parking space candidates, whereby, even when the entire part of some parking space candidate is not displayed on the touch panel 32, the presence of the parking space candidate can be reliably notified to the occupant by the display of the corresponding icon 55 for selection.

Figure 7B:
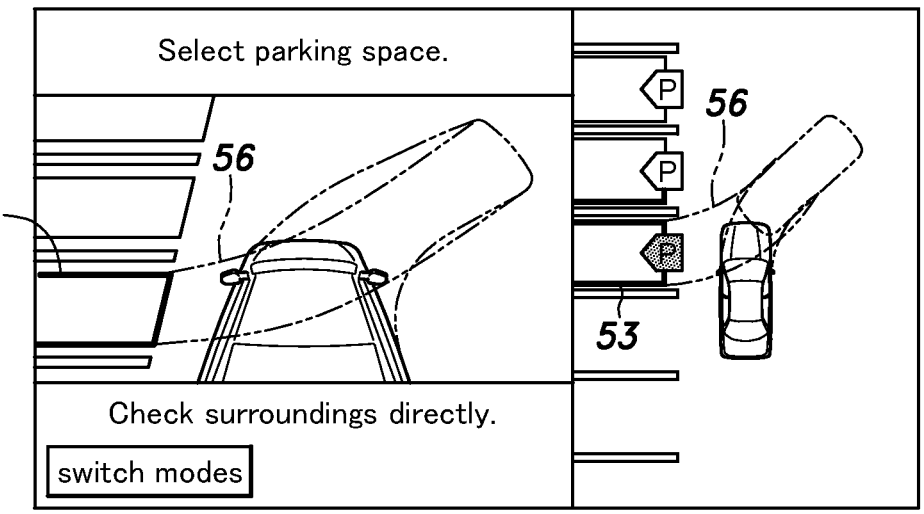
FIG. 7B is a diagram showing the screen display (parking search screen) of the touch panel after the selection of the target parking space.

As shown in FIG. 7B, when the occupant operates the selection input member 35 to change the parking space candidate selected by the cursor in the parking search screen and performs a determination operation by operating the touch panel 32 or the selection input member 35, the action plan unit 43 sets the selected parking space candidate as the target parking space 53 causes the icon 55 corresponding to the frame set in the target parking space 53 to be displayed on the touch panel 32 in a color different from the color of the other icons 55. The touch panel 32 may be considered a part of the selection input member 35 in the sense that the touch panel 32 can perform the determination operation. The display in the different color may be performed for a predetermined time, or may be continued until the drive control starts. Further, the action plan unit 43 displays the trajectory 56 from the current position to the target parking space 53 on the look-down image and the bird's-eye image in a superimposing manner.

As shown in FIG. 8A, the target parking space 53, the stop position 57, and the trajectory 56 (see FIG. 7B) are displayed on the parking screen such that the target parking space 53, the stop position 57, and the trajectory 56 overlap with the travel direction image and the look-down image. While executing the driving process, the action plan unit 43 determines whether the stop position 57 is suitable. In a case where the parking space candidate the occupant has selected as the target parking space 53 is the undelimited parking space 51 (see FIGS. 6A to 6D) regarded as the parking area

50 by the external environment recognizing unit 41, an obstacle 58 may be present in a rear area of the target parking space 53. Incidentally, a vehicle stopper (wheel stopper) is not included in the obstacle 58 because the vehicle stopper is naturally present in the target parking space 53 (the parking area 50). Further, even if the space detected by the external environment recognizing unit 41 is equal to or larger than the parking size of a certain vehicle, the obstacle 58 may be placed in the rear area of the target parking space 53 after the start of the driving process.

In these cases, the stop position 57 set by the action plan unit 43 at the selection of the target parking space 53 by the occupant (hereinafter abbreviated as "the stop position 57 set at the selection") may not be suitable. Accordingly, while executing the driving process, the action plan unit 43 determines whether the stop position 57 set at the selection is suitable. More specifically, when the vehicle moves backward, the action plan unit 43 determines whether the obstacle 58 is present at the rear of the vehicle (namely, in the travel direction of the vehicle) based on the signals from the sonars 18.

In a case where the obstacle 58 is present at the rear of the vehicle, as shown in FIG. 8B, the action plan unit 43 corrects the stop position 57 along the trajectory 56 such that the stop position 57 gets closer to the entrance 53A of the target parking space 53 than the obstacle 58. Namely, the action plan unit 43 corrects the stop position 57 to a front side of the vehicle. At this time, the action plan unit 43 corrects only the stop position 57 with a movement amount equal to or less than a prescribed first upper limit without correcting the position of the target parking space 53.

In the present embodiment, the first upper limit is set to a value larger than a half of the margin M (see FIG. 4). Accordingly, when the vehicle is stopped at the stop position 57 (namely, when the rear end of the vehicle reaches the stop position 57), the vehicle may stick out of the target parking space 53 to the front. In this way, in a case where the occupant selects the target parking space 53 even though the obstacle 58 is present therein or in a case where the obstacle 58 appears in the target parking space 53 after the occupant selects the target parking space 53, the vehicle may stick out of the target parking space 53 to the front and the automatic parking may end in such a state. In these cases, the occupant may determine whether the current parking space needs to be changed after the end of the automatic parking, and may select another parking space candidate as the target parking space 53 to perform the automatic parking again, if necessary. In another embodiment, the first upper limit may be set to a value equal to or less than a half of the margin M. In such a case, a front end of the vehicle stopped at the stop position 57 may be located at the rear of a front end of the target parking space 53.

Upon correcting the stop position 57, the action plan unit 43 causes the touch panel 32 to move the stop position 57, which is displayed on the travel direction image and the look-down image of the parking screen, to the corrected position.

As shown in FIG. 8C, after causing the touch panel 32 to display the corrected stop position 57, the action plan unit 43 stops the vehicle at the corrected stop position 57 and ends the driving process. When the driving process ends, the stop position 57 displayed on the touch panel 32 and the position of the vehicle (more specifically, the actual position of a rear end of the vehicle) substantially match each other.

In this way, in a case where the action plan unit 43 determines that the stop position 57 is not suitable due to the detection of the obstacle 58 present in the target parking space 53 when the vehicle is moving to the stop position 57 during the driving process, the action plan unit 43 corrects the stop position 57 with the movement amount equal to or less than the first upper limit. Thus, it is possible to suppress the discomfort of the occupant caused by the difference between the stop position 57 displayed on the touch panel 32 and the position of the vehicle.

Also, at this time, the action plan unit 43 corrects the stop position 57 along the trajectory 56 such that the stop position 57 gets closer to an entrance 53A to the target parking space 53. Thus, the stop position 57 can be easily corrected without correcting the trajectory 56.

Further, while executing the driving process, the action plan unit 43 does not correct the position of the target parking space 53 displayed on the touch panel 32 regardless of whether the stop position 57 is suitable. Thus, it is possible to prevent the discomfort of the occupant caused by a change in the position of the target parking space 53.

On the other hand, as shown in FIG. 9A, the parking space candidate selected as the target parking space 53 by the occupant may be an area regarded as the delimited parking space 52 (see FIG. 5) by the external environment recognizing unit 41. In such a case, if the two delimiting lines 54 delimiting the delimited parking space 52 are breaking, blurred, or dirty, the external environment recognizing unit 41 may not be able to detect the two delimiting lines 54 in the rear area of the target parking space 53.

In such a case, the stop position 57 set at the selection may not be suitable. Accordingly, while executing the driving process, the action plan unit 43 determines whether the stop position 57 set at the selection is suitable. More specifically, when the vehicle moves backward, the action plan unit 43 detects the delimiting lines 54 on both sides of the target parking space 53 based on the image captured by the external cameras 19 and determines whether the delimiting lines 54 reach the rear area of the target parking space 53.

As shown in FIG. 9B, upon determining that the delimiting lines 54 do not reach the rear area of the target parking space 53, the action plan unit 43 corrects the stop position 57 along the trajectory 56 such that the stop position 57 gets closer to the entrance 53A of the target parking space 53 than rear ends of the detected delimiting lines 54. Namely, the action plan unit 43 corrects the stop position 57 to the front side of the vehicle. At this time, the action plan unit 43 corrects only the stop position 57 with a movement amount equal to or less than a prescribed second upper limit without correcting the position of the target parking space 53. It is more difficult for the occupant to recognize that the delimiting lines 54 on both sides of the target parking space 53 is undetectable (more specifically, the delimiting lines 54 of the parking space candidate displayed on the touch panel 32 are undetectable to the external environment recognizing unit 41) than to recognize that the obstacle is present in the target parking space 53. Accordingly, if the driving process ends in a state where the vehicle sticks out of the target parking space 53 due to the undetectability of the delimiting lines 54, the discomfort of the occupant is more likely to be caused by the difference between the stop position 57 displayed on the touch panel 32 and the position of the vehicle. Considering this, the second upper limit is set smaller than the first upper limit.

Further, the second upper limit is a value equal to or less than a distance from the front end of the vehicle to the front end of the target parking space 53. Namely, the second upper limit is set such that the vehicle fits in the target parking space 53. In the present embodiment, the second upper limit is set to a half of the margin M (see FIG. 4). In another embodiment, the second upper limit may be set to a value less than a half of the margin M. In such a case, the front end of the vehicle stopped at the stop position 57 may be located on the rear side of the front end of the target parking space 53.

Upon correcting the stop position 57, the action plan unit 43 causes the touch panel 32 to move the stop position 57 displayed on the travel direction image and the look-down image of the parking screen to the corrected position. As shown in FIG. 9C, after causing the touch panel 32 to display the corrected stop position 57, the action plan unit 43 stops the vehicle at the corrected stop position 57 and ends the driving process. When the driving process ends, the stop position 57 displayed on the touch panel 32 and the position of the vehicle (more specifically, the actual position of the rear end of the vehicle) substantially correspond to each other, as shown in FIG. 8B.

Thus, upon determining that the stop position 57 is not suitable due to the undetectability of the delimiting lines 54 on both sides of the target parking space 53 (delimited parking space 52) during the driving process, the action plan unit 43 corrects the stop position 57 with the movement amount equal to or less than the second upper limit that is smaller than the first upper limit. Accordingly, in a case where the stop position 57 is corrected due to the undetectability of the delimiting lines, the stop position 57 is corrected with the movement amount equal to or less than the second upper limit that is smaller than the first upper limit (the upper limit of the movement amount in a case where the stop position 57 is corrected due to the detection of the obstacle 58). Accordingly, when the vehicle is stopped at the stop position 57 corrected due to the undetectability of the delimiting lines 54, it is possible to suppress the discomfort of the occupant caused by the difference between the stop position 57 displayed on the touch panel 32 and the position of the vehicle.

Further, at this time, the second upper limit is set such that the vehicle fits in the target parking space 53, and thus the vehicle does not stick out of the target parking space 53 at the end of the driving process. Accordingly, it is possible to suppress the discomfort of the occupant regarding the position of the vehicle at the end of the driving process.

As described above, while executing the driving process, the action plan unit 43 causes the touch panel 32 to display the trajectory 56 and the stop position 57 and determines whether the stop position 57 is suitable based on the external environment information acquired by the sonars 18 and the external cameras 19. Upon determining that the stop position 57 is not suitable, the action plan unit 43 corrects the stop position 57 and causes the touch panel 32 to display the stop position 57 that has been corrected. Thus, in a case where the action plan unit 43 determines that the stop position 57 is not suitable while executing the driving process, it is possible to reduce a difference between the corrected stop position 57 displayed on the touch panel 32 and the position of the vehicle. Accordingly, it is possible to suppress the discomfort of the occupant caused by the difference between the stop position 57 displayed on the touch panel 32 and the position of the vehicle at the end of the driving process.

Concrete embodiments of the present invention have been described in the foregoing, but the present invention should not be limited by the foregoing embodiments and various modifications and alterations are possible within the scope of the present invention. For example, the concrete structure, arrangement, number, process content and procedure, etc. of the components/units of the embodiments may be appropriately changed within the scope of the present invention. Also, not all of the structural elements shown in the above embodiments are necessarily indispensable and they may be selectively adopted as appropriate.

The invention claimed is:

1. A parking assist system, comprising:
    an external environment information acquiring unit configured to acquire external environment information around a vehicle;
    a parking space candidate detecting device configured to detect a first parking space and/or a second parking space as at least one parking space candidate based on the external environment information, the first parking space being an undelimited parking space set in a parking area, the second parking space being an available delimited parking space;
    a display device configured to display the parking space candidate;
    a selection input member configured to receive a selection operation by a user, the selection operation being an operation to select the parking space candidate displayed on the display device; and
    a control device configured to control a screen display of the display device, to set the parking space candidate selected by the user to a target parking space, to set a stop position where the vehicle should be stopped in the target parking space, and to execute a driving process to autonomously move the vehicle along a trajectory from a current position of the vehicle at a time when the selection input member receives the selection operation to the stop position,
    wherein while executing the driving process, the control device causes the display device to display the trajectory and the stop position and determines whether the stop position is suitable based on the external environment information, and
    upon determining that the stop position is not suitable, the control device corrects the stop position and causes the display device to display the stop position that has been corrected.

2. The parking assist system according to claim 1, wherein the control device is configured to correct the stop position along the trajectory such that the stop position gets closer to an entrance to the target parking space.

3. The parking assist system according to claim 2, wherein the parking space candidate detecting device is configured to detect the first parking space as the parking space candidate,
    the control device is configured to determine that the stop position is not suitable when an obstacle present in the target parking space is detected, and
    upon determining that the stop position is not suitable due to detection of the obstacle, the control device corrects the stop position with a movement amount equal to or less than a prescribed first upper limit.

4. The parking assist system according to claim 2, wherein the parking space candidate detecting device is configured to detect the second parking space as the parking space candidate,
    the control device is configured to determine that the stop position is not suitable when a delimiting line on a side of the target parking space is undetectable, and
    upon determining that the stop position is not suitable due to undetectability of the delimiting line, the control device corrects the stop position with a movement amount equal to or less than a prescribed second upper limit.

5. The parking assist system according to claim 4, wherein a length of the target parking space is longer than a total length of the vehicle, and
    the second upper limit is set such that the vehicle fits in the target parking space.

6. The parking assist system according to claim 2, wherein the parking space candidate detecting device is configured to detect the first parking space and the second parking space as the parking space candidate,
    the control device is configured to determine that the stop position is not suitable when an obstacle present in the target parking space is detected or when a delimiting line on a side of the target parking space is undetectable,
    upon determining that the stop position is not suitable due to detection of the obstacle, the control device corrects the stop position with a movement amount equal to or less than a prescribed first upper limit, and
    upon determining that the stop position is not suitable due to undetectability of the delimiting line, the control device corrects the stop position with a movement amount equal to or less than a prescribed second upper limit that is smaller than the first upper limit.

7. The parking assist system according to claim 1, wherein even if a size of the first parking space and/or the second parking space detected based on the external environment information is less than a size of the target parking space, the parking space candidate detecting device detects the first parking space and/or the second parking space as the parking space candidate.

8. The parking assist system according to claim 1, wherein while executing the driving process, the control device causes the display device to display the target parking space and does not correct a position of the target parking space regardless of whether the stop position is suitable.

* * * * *